United States Patent

[11] 3,625,240

[72] Inventor: Stanley I. MacDuff, South Bend, Ind.
[21] Appl. No.: 825,353
[22] Filed: May 16, 1969
[45] Patented: Dec. 7, 1971
[73] Assignee: The Bendix Corporation

[54] HYDRAULIC BOOSTER SYSTEM
3 Claims, 2 Drawing Figs.

[52] U.S. Cl. ................................................. 137/113, 137/117, 303/6 C
[51] Int. Cl. .......................................................... G05d 11/00
[50] Field of Search ............................................ 137/111–114

[56] References Cited
UNITED STATES PATENTS
3,170,536  2/1965  Van House et al. .......... 180/82
3,289,688  12/1966  Malott ............................ 137/114
3,407,894  10/1968  Thompson et al. ............ 180/79.2 X FOREIGN PATENTS
996,537  6/1965  Great Britain ................. 137/114

Primary Examiner—Laverne D. Geiger
Assistant Examiner—David J. Zobkiw
Attorneys—C. F. Arens and Plante, Arens, Hartz, Hix and Smith ABSTRACT: A hydraulic booster system for a vehicle which is operable when the vehicle's engine is running and also when the engine is not running provided the vehicle is in motion. Said hydraulic booster system including a flow control valve means for connecting a second pump means to the system upon partial or complete fluid pressure failure of a first pump means.

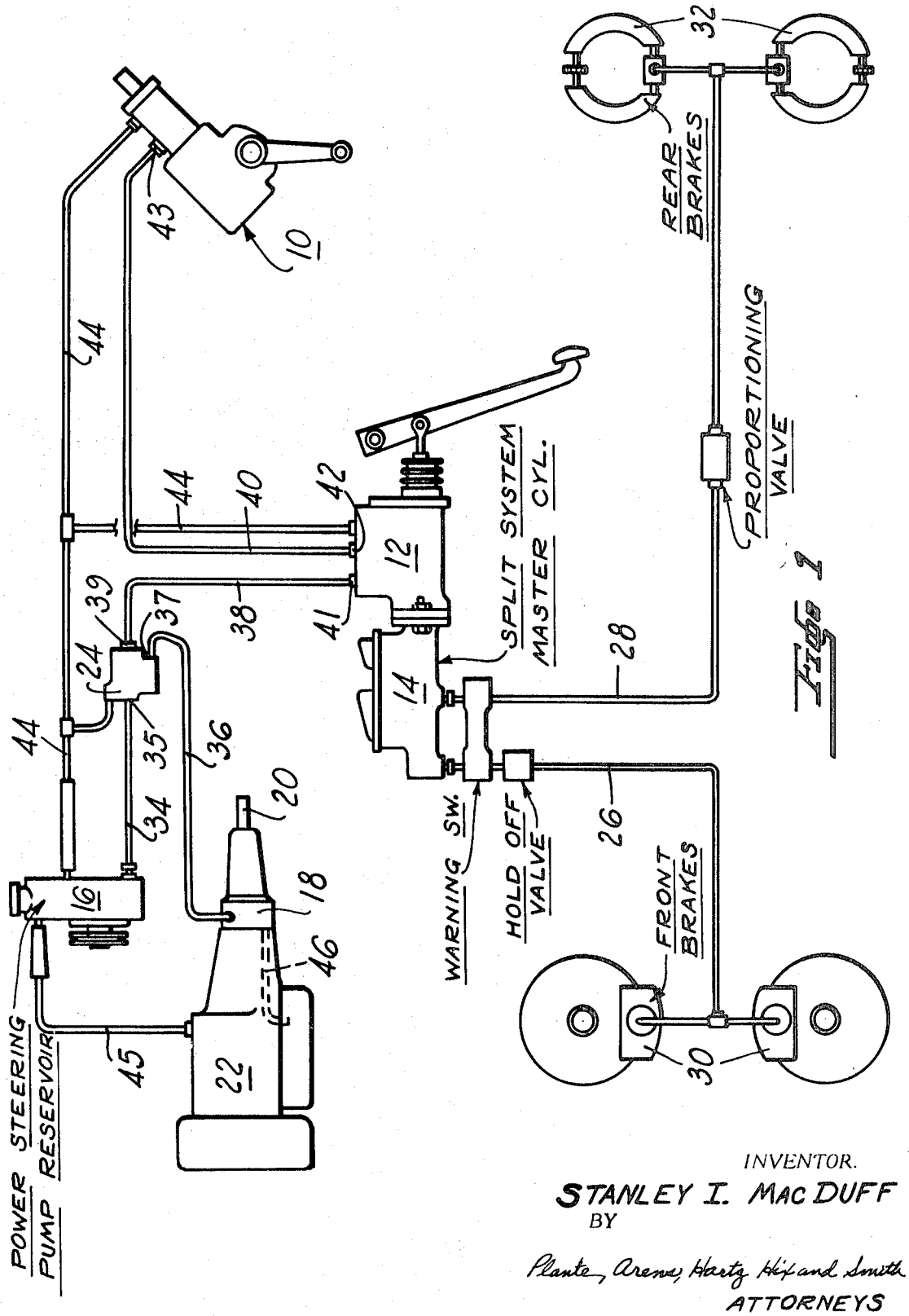

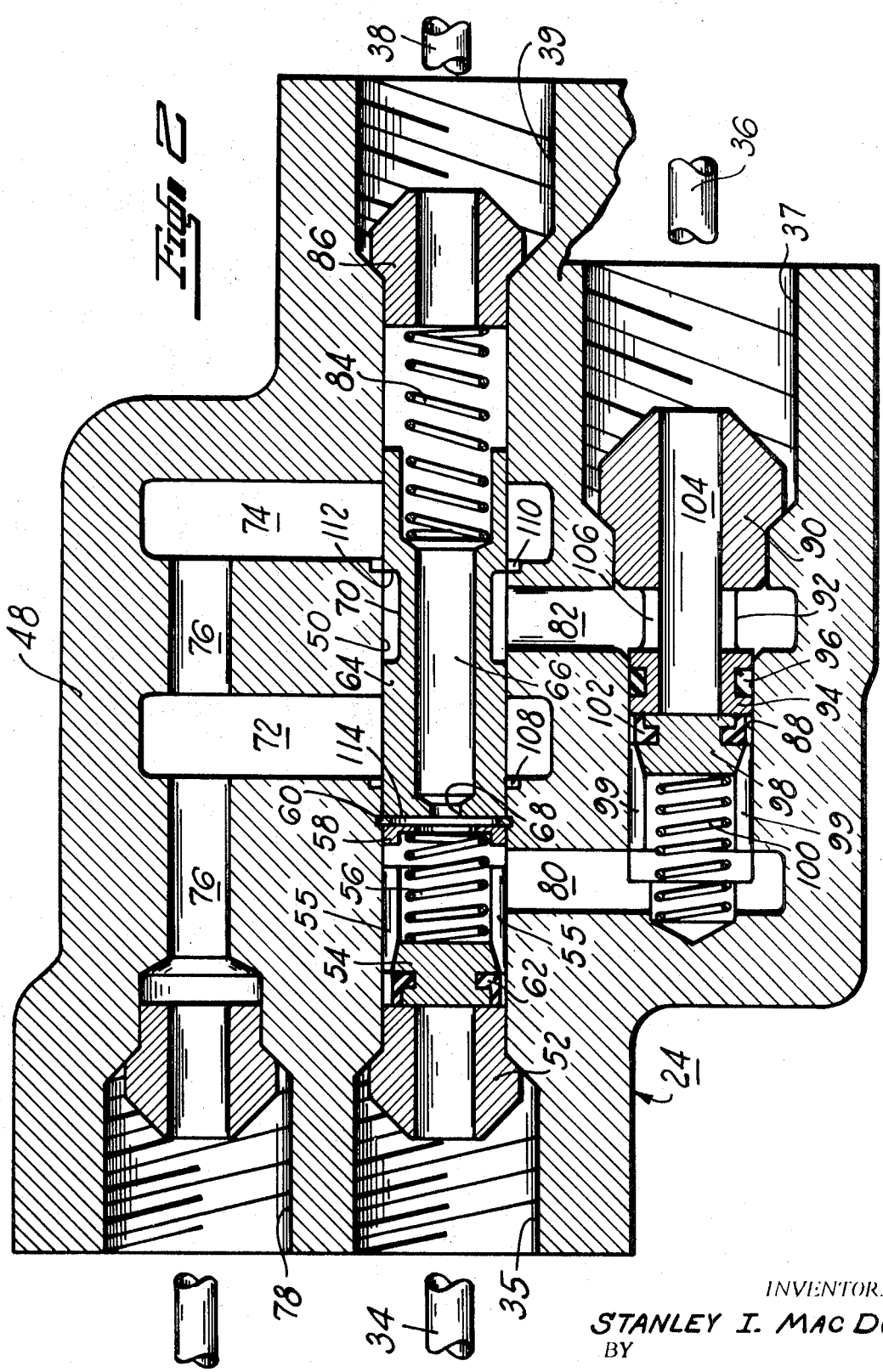

HYDRAULIC BOOSTER SYSTEM

SUMMARY OF THE INVENTION

This invention relates to hydraulic systems and more particularly to power braking systems for vehicles. It is further noted that the vehicle system may include a combined power braking and steering system.

In most power braking systems, hydraulic power braking assist is available when the engine is running regardless of whether the vehicle is moving and power assist is lost when the engine is not running since conventional practice is to have the power steering pump, which powers the hydraulic brake booster, engine driven. As may be readily observed, an advantage could be attained if power braking assist was not solely dependent on engine operation or a single source of pressurized hydraulic fluid.

It is an object of this invention to provide a hydraulic brake booster system employing two sources of pressurized hydraulic fluid.

It is an object of this invention to provide a hydraulic brake booster system employing two sources for pressurizing hydraulic fluid and a flow control means for connecting the second source to the system upon partial or complete pressure failure of the first source.

It is an object of this invention to provide a combined brake and steering system in a passenger automobile with an auxiliary pump driven from a different source of energy than the conventional primary pump, and to provide means within the system to enable the auxiliary pump to take over the task of supplying fluid upon any failure of the primary pump.

Other objects and features of the invention will be apparent from the following description of the hydraulic booster system taken in connection with the accompanying drawings.

BRIEF DESCRIPTION OF THE DRAWINGS

FIG. 1 is a diagrammatic view of a braking and steering system for an automotive vehicle shown in accordance with the invention.

FIG. 2 is a longitudinal sectional view of the flow control valve means shown in FIG. 1 and constructed in accordance with the invention.

DETAILED DESCRIPTION OF THE INVENTION

Although this invention is shown in a braking system embodiment, and thus, may well be most valuable in the braking art, it is felt that the invention may be used for any application where hydraulic controls, requiring a constant source of pressurized fluid, are required.

With reference now to FIG. 1, there is shown a conventional open-center hydraulic power steering gear valve 10, a hydraulic booster unit 12, also well known to those skilled in the art, which operates a master cylinder 14, a primary engine driven power steering pump 16, an auxiliary pump 18 arranged to be driven by the output shaft 20 of an automatic transmission 22, and a flow control valve means 24 for combining the output of the primary pump 16 and the auxiliary pump 18.

For the purpose of illustration, the auxiliary pump 18 has been shown assembled into the drive shaft end of a conventional automatic transmission 22. The auxiliary pump 18 could also be assembled in a similar location in connection with a conventional step gear transmission, although such an installation would not be as simple as with the automatic transmission because a different lubricant is used in the step gear transmissions; whereas the automatic transmissions use the same fluid as a lubricant as is normally used in hydraulic power steering systems. It may now be seen that such a transmission driven pump will be operated by the momentum of the vehicle if it is in motion and, under this condition, will discharge fluid for utilization in the brake and steering system. Since the vehicle and its engine operate over a wide range of speeds, and the pumps normally used are of the fixed displacement type, it has been necessary to provide power steering pumps with a flow control device which delivers a constant volume of fluid to the steering gear regardless of the total volume being delivered by the pumps. The conventional flow control valve is usually of the bypass type, operating to permit the excess flow from the pump to return to the system reservoir. It must be recognized, however, that all of the fluid delivered by the pump is initially pressurized to the same level as the fluid which is delivered to the power steering gear, and when this fluid id delivered back to the reservoir by the flow control valve, there must be a substantial conversion of power into heat. With the addition of an auxiliary pump, the amount of fluid which must be bypassed is essentially doubled. If the fluid were all delivered to a conventional flow control valve, the heating and loss of power when the system is pressurized would be doubled. With reference now generally to the flow control valve means 24 of this invention, the valve will bring the discharge of the auxiliary pump 18 into the system at such times as the primary pump 16 is either not operating or is producing less than the desired flow. During those periods when the primary pump 16 is delivering the desired flow volume, this novel control valve permits the discharge from the auxiliary pump 18 to bypass freely back to the system reservoir regardless of whether or not the system is being pressurized through operation of either the brake booster 12 or the steering gear 10. This reduces power loss and heating in the system and also eliminates auxiliary pump 18 wear to insure long life, reliable service and overall vehicle safety.

With further reference now to the system shown in FIG. 1, the master cylinder 14 is shown delivering hydraulic fluid through separate lines 26 and 28 to front disc brakes 30 and rear drum brakes 32, respectively. The discharge port of the pump 16 is connected by a conduit 34 to a suitable port 35 in the flow control valve 24 and the auxiliary pump 18 is also connected by a conduit 36 to another port 37 of the flow control valve 24. A conduit 38 is connected on one end to a third port 39 in the flow control valve 24 is connected on its other end to a port 41 in the brake booster 12. Another conduit 40 connects a second port 42 in the brake booster 12 to the inlet port 43 of the power steering gear. The flow control valve 24, the brake booster 12 and the power steering gear 10 are all equipped with return ports which are connected to a system of conduits, designated 44, leading back to the reservoir of the primary pump 16. Another conduit 45 leads from a point in the reservoir of the power steering pump, which is essentially at the highest fluid level desired in that reservoir, and discharges into the housing of the automatic transmission 22 and thence to its reservoir (unnumbered). A suction conduit 46 is shown in dotted lines in the interior of the transmission supplying fluid to the auxiliary pump 18. This conduit 46 would desirably extend only part way into the transmission reservoir so that in the event of failure of an external hydraulic line in the brake and steering system, it would not be possible for the auxiliary pump 18 to completely remove the hydraulic fluid lubricant from the transmission.

Referring now to FIG. 2, therein is shown the flow control valve means 24 in detail. The flow control valve 24 is comprised of a casting or housing 48 having the conduit 34 connected into the threaded port 35. A bore 50 extends from the bottom of port 35 through the casting 48 of the flow control valve 24 to a second threaded port 39 which is connected to the conduit 38. A tube seat 52 is pressed into the bore 50 at the bottom of the port 35, and serves not only to receive the flared end of the conduit 34 but also acts as a seat for a check valve 54 having axially extending channels 55. The check valve 54 is urged into contact with said seat by a spring 56. The spring 56 is seated against a washer 58 engaging a snapring 60 fitted in a suitable groove in the bore 50. The check valve 54 is shown provided with a lip seal 62 and is constructed and arranged to permit fluid from the primary pump 16 to enter the bore 50 but fluid is prevented from flowing in the reverse direction from the bore 50 into port 35 and conduit 34. To the right of the snapring 60 a flow control valve plunger 64 is slidably, but closely, fitted in the bore 50. The valve plunger 64 has a passage 66 drilled through it concentrically. The passage 66 is restricted at the left-hand end to form an orifice 68. The valve plunger 64 is also formed with an annular groove 70 midway of its length. Adjacent to each end of the valve plunger 64 is a cavity, cored into the casting 48, the one on the left being designated 72 and the one on the right being designated 74. These cavities form an annular passage around the respective ends of the plunger 64 and extend laterally therefrom and are intersected by a drilled passage 76 extending from the bottom of a threaded port 78. This threaded port 78 is connected to the return conduit system 44. The housing 48 is provided with two additional cored cavities 80 and 82. The cavity 80 communicates with the bore 50 between the check valve 54 and the left end of the valve plunger 64. The cavity 82 communicates with the annular groove 70 formed in the valve plunger 64. A spring 84 urges the valve plunger to a normal, or inactive position with its left end in contact with the snap ring 60. The spring 84 is retained at its right-hand end by a tube seat 86 for conduit 38 in threaded port 39. The cored recesses 80 and 82 extend laterally of bore 50 opposite recesses 72 and 74 and are intersected by a bore 88 extending from threaded port 37. A tube seat 90 pressed into the bore 88 is formed with an intermediate groove 92 aligned with the recess 82, an an enlarged portion 94 which fits the bore 88 in between the recess 80 and 82 and is sealed therein by an O-ring 96. The left-hand end of this tube seat also constitutes a seat for a check valve 98 similar to the check valve 54. The check valve 98 is urged into contact with the seat by a spring 100 whose other end is seated in the blind end of bore 88. The check valve 98 includes axially extending channels 99 along the body portion. The check valve 98 is also provided with a lip seal 102. The tube seat has a central passage 104 drilled through it which is closed at its left-hand end by the check valve 98 so that fluid can flow therethrough into the recess 80 but cannot flow from the recess 80 back into the threaded port 37. The passage 104 in the tube seat 90 is intersected by a radial passage 106 which permits passage 104 to communicate continuously with the recess 82. The conduit 36 conducting fluid from the auxiliary pump 18 is connected to the threaded port 37. At the place where the bore 50 passes through the left-hand walls of the cavities, or recesses 72 and 74, the housing 48 is machined with counterbores 108 and 110, respectively, providing accurately located shoulders in relation to the valve plunger 64. When the valve plunger 64 is in its inoperative position, as illustrated, the right-hand edge 112 of the groove 70 slightly overlaps the shoulder 110 while at the same time the shoulder formed by the left end 114 of the valve plunger 64 substantially overlaps the shoulder 108.

MODE OF OPERATION OF THE INVENTION

Referring now to FIGS. 1 and 2, the operation of the system is accomplished as follows: Upon starting the vehicle engine (not shown), fluid from the primary pump 16 enters port 35, passes through tube seat 52, lifting the check valve 54 therefrom, and continues through the restricted orifice 68 in the valve plunger 64, the longitudinal passage 66 and thence through the tube seat 86 into conduit 38 leading to the brake booster 12. As the flow increases to a predetermined volume (in most cases approximately 2 gal./min.), the pressure drop through the restriction 68 will become great enough so that an unbalanced force will be exerted upon the valve plunger 64 equal to the force of the spring 84. This will result in the plunger 64 moving to the right until its end shoulder 114 unlaps the shoulder 108. When this occurs, the fluid in excess of the predetermined quantity passing through the restriction 68 will enter the cavity 72 and pass through the passage 76 to port 78 and through conduit system 44 back to the power steering reservoir. As is well known in the art, if the system is pressurized through operation of the open-center valves of either the brake booster 12 or the steering gear 10, the plunger 64 will shift so as to reduce the degree of underlapping of shoulders 114 and 108 to create the necessary restriction controlling the escape of fluid to the reservoir. It will be observed that in the process of unlapping shoulders 114 and 108, the shoulders 112 and 110 are moved apart very substantially and, therefore, if the vehicle is brought into motion, causing pump 18 to discharge fluid, this fluid will flow through conduit 36, tube seat 90, cavity 82, groove 70, cavity 74, and thence to the reservoir. Since a certain amount of pressure drop (possibly 30 p.s.i.) is required to cause the measured flow to pass through the restriction 68, the chamber 80 will be pressurized to that extent and, therefore, there will be no tendency for the auxiliary pump discharge 18 to lift the check valve 98 and enter this chamber. However, if while the vehicle is in motion, a failure of the primary pump should occur, as by stalling of the vehicle engine or failure of the pump drive belt or for any other cause, the reduction in flow through the restriction 68 will permit the spring 84 to move the plunger 64 back towards the snapring 60 thereby overlapping the shoulders 108 and 114 and bringing the shoulders 110 and 112 into proximity. The proximity of these shoulders will restrict the flow of fluid from the auxiliary pump 18 passing from cavity 82 to cavity 74, causing the pressure in cavity 82 to become greater than the pressure in cavity 80. This pressure differential will cause the check valve 98 to lift from its seat and fluid from the auxiliary pump 18 will enter cavity 80 and the bore 50 and thus will flow through the restricted orifice 68 to the steering and braking system. If the amount of fluid being supplied by the auxiliary pump exceeds the required flow through orifice 68, the plunger 64 will, in its normal fashion, move to the right against the force of the spring 84 causing the shoulders 110 and 112 unlap thereby permitting the excess flow to pass from cavity 82 to cavity 74 and thence to the reservoir. Thus, it will be seen that as long as the primary pump 16 supplies enough fluid to meet the predetermined flow requirement, the auxiliary pump 18 operates in a completely unloaded condition, but at any time that the discharge from the primary pump falls below the measured quantity, fluid from the auxiliary pump 18 will be introduced into the system in the necessary amount.

It is noted that all of the fluid is returned to the power steering pump reservoir and if no means were provided for its removal, it would be caused to fill completely and over flow. For that reason, the conduit 45 acts as an overflow preventer and conducts all fluid in excess of the pump reservoir capacity into the transmission reservoir.

No further description of the operation of the brake booster and power steering gear will be made as they are assumed to be well understood by those skilled in the art.

While the specific details have been herein shown and described, the invention is not confined thereto as other substitutions can be made within the spirit and scope of the invention.

I claim:

1. In a control for hydraulic fluid, first and second inlet ports connected respectively to first and second pressurized sources, and outlet port connectable to a fluid motor, a return port connectable to a reservoir of hydraulic fluid, first means controlling flow between said first inlet port and said outlet and return ports, said first means including flow-responsive means normally closing off flow between said first inlet port and said return port and establishing flow between said first inlet port and said outlet port, and second means responsive to said first and second inlet port pressures for normally closing off flow between said second inlet port and said outlet port, said second means responsive to said first and second inlet port pressures so as to be responsive to a predetermined minimum pressure at said first inlet port to establish flow between said second inlet port and said outlet port;

said second inlet port being communicated to said return port;

said flow-responsive means being operable to control fluid communication between said second inlet port and said return port.

2. A control for hydraulic fluid as recited in claim 1; and said flow-responsive means permitting flow of fluid between the first inlet port and the return port when a predetermined maximum pressure is established at said first inlet port.

3. A control for hydraulic fluid as recited in claim 2; and
a bore connecting said first inlet port and said outlet port;
said fl....ow-res means including a shuttle member slidably mounted in said bore to control fluid flow between said first and second inlet ports and said return port;
said shuttle member having passage means extending therethrough to communicate fluid to said outlet port, said passage means including a flow-restricting orifice to limit the pressure at the outlet port to a predetermined maximum level.

* * * * *